US010645123B1

(12) United States Patent
Vishwanathan et al.

(10) Patent No.: US 10,645,123 B1
(45) Date of Patent: May 5, 2020

(54) NETWORK TRAFFIC SWITCHING FOR VIRTUAL MACHINES

(71) Applicant: Juniper Networks, Inc., Sunnyvale, CA (US)

(72) Inventors: Suresh Vishwanathan, Bangalore (IN); Avinash Kumar Singh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 625 days.

(21) Appl. No.: 15/392,651

(22) Filed: Dec. 28, 2016

(51) Int. Cl.
*H04L 29/06* (2006.01)
*G06F 9/455* (2018.01)

(52) U.S. Cl.
CPC ........ *H04L 63/205* (2013.01); *G06F 9/45558* (2013.01); *H04L 63/0254* (2013.01); *H04L 63/10* (2013.01); *G06F 2009/45587* (2013.01); *G06F 2009/45595* (2013.01)

(58) Field of Classification Search
CPC .... H04L 63/205; H04L 63/0254; H04L 63/10
USPC ........................................................... 726/1
See application file for complete search history.

(56) References Cited

U.S. PATENT DOCUMENTS

2010/0054129 A1* 3/2010 Kuik ..................... H04L 47/10
370/235
2016/0048464 A1 2/2016 Nakajima et al.

* cited by examiner

*Primary Examiner* — Eleni A Shiferaw
*Assistant Examiner* — Angela R Holmes
(74) *Attorney, Agent, or Firm* — Harrity & Harrity, LLP

(57) ABSTRACT

A cloud network may include a distributed security switch (DSS). The DSS may be to receive configuration information from the hypervisor. The configuration information may include a set of access mode attributes and a security policy. The DSS may be to determine that a packet is to be directed from a source virtual machine to a target virtual machine. The DSS may be to identify an egress interface of the source virtual machine and an ingress interface of the target virtual machine. The egress interface may be associated with a first access mode attribute and the ingress interface being associated with a second access mode attribute. The DSS may be to selectively route the packet, using the shared memory, based on the first access mode attribute, the second access mode attribute, and the security policy.

13 Claims, 7 Drawing Sheets

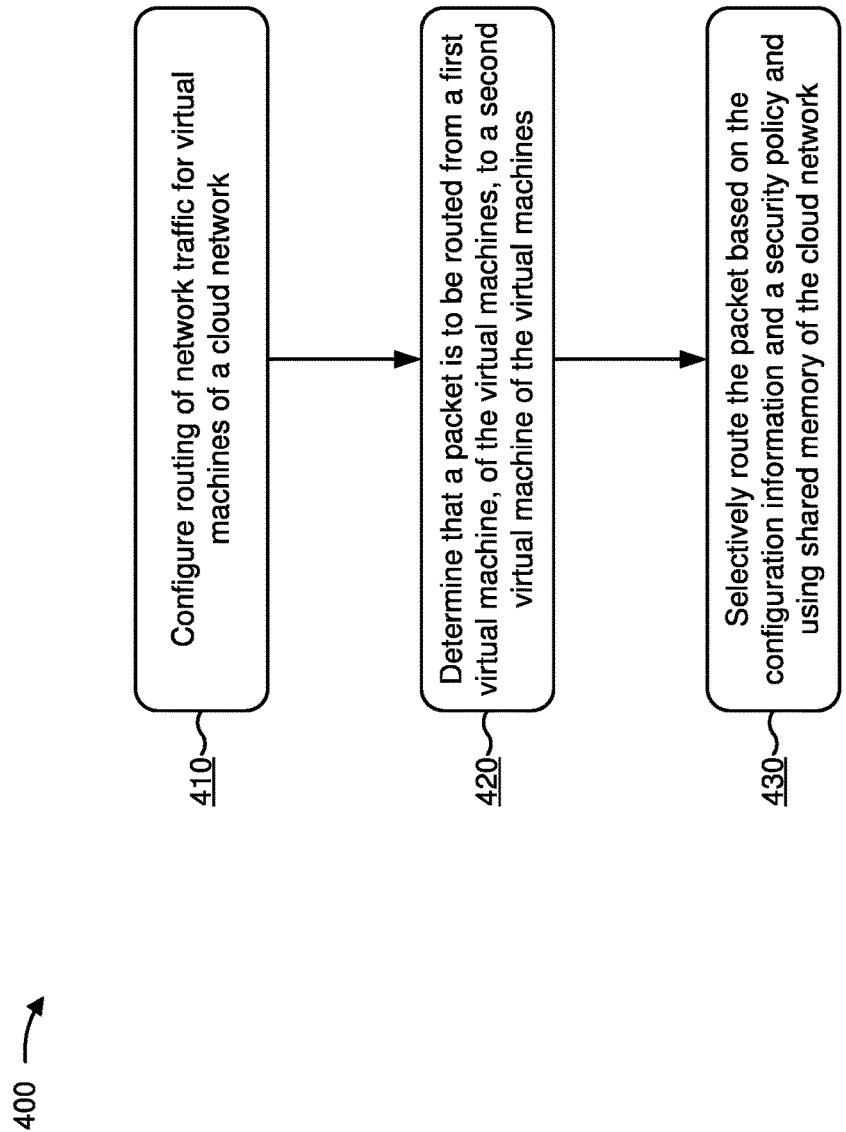

NETWORK TRAFFIC SWITCHING FOR VIRTUAL MACHINES

BACKGROUND

In computing, a virtual machine is a software emulation of a physical computer system. More than one virtual machine may be configured to run on a common physical machine, with each virtual machine functioning as a self-contained platform and running its own operating system and software applications. Each virtual machine may include its own set of virtual hardware upon which its operating system is loaded.

Multiple virtual machines may be provided on a server system, such as a cloud server. On such a server system, the multiple virtual machines may exchange data with each other by transmitting packets.

SUMMARY

According to some possible implementations, a cloud network may include a plurality of virtual machines, a shared memory shared by the plurality of virtual machines, and a hypervisor. The cloud network may include a distributed security switch. The distributed security switch may be to receive configuration information from the hypervisor. The configuration information may include a set of access mode attributes for interfaces of the plurality of virtual machines and a security policy for the plurality of virtual machines. The distributed security switch may be to determine that a packet is to be directed from a source virtual machine, of the plurality of virtual machines, to a target virtual machine of the plurality of virtual machines. The distributed security switch may be to identify an egress interface of the source virtual machine and an ingress interface of the target virtual machine. The egress interface may be associated with a first access mode attribute, of the set of access mode attributes, and the ingress interface being associated with a second access mode attribute of the set of access mode attributes. The distributed security switch may be to selectively route the packet, using the shared memory, based on the first access mode attribute, the second access mode attribute, and the security policy.

According to some possible implementations, a non-transitory computer-readable medium may store one or more instructions that, when executed by one or more processors, cause the one or more processors to identify a packet in shared memory of an egress interface of a source virtual machine of a first cloud network of a set of cloud networks. The one or more instructions, when executed by the one or more processors, may cause the one or more processors to enforce a security policy on the packet, using computing resources of the source virtual machine, based on an access mode relating to the packet and a security policy configuration relating to the set of cloud networks. The one or more instructions, when executed by the one or more processors, may cause the one or more processors to selectively route the packet, using the computing resources of the source virtual machine and the shared memory, to a target virtual machine of a second cloud network of the set of cloud networks based on enforcing the security policy. The target virtual machine may be to obtain the packet from the shared memory. The second cloud network may be different from the first cloud network According to some possible implementations, a method may include receiving, by a switch of a cloud network, configuration information. The configuration information may identify a set of access mode attributes for interfaces of a plurality of virtual machines of the cloud network and a security policy for the plurality of virtual machines. The method may include determining, by the switch of the cloud network, that a packet is to be directed from a source virtual machine, of the plurality of virtual machines, to a target virtual machine of the plurality of virtual machines. The method may include identifying, by the switch of the cloud network, one or more access mode attributes, of the set of access mode attributes, relating to the source virtual machine or the target virtual machine. The method may include selectively routing, by the switch of the cloud network, the packet, using shared memory shared by the source virtual machine and the target virtual machine, based on the one or more access mode attributes and the security policy.

BRIEF DESCRIPTION OF THE DRAWINGS

FIG. 4 is a flow chart of an example process for network traffic switching for virtual machines.

DETAILED DESCRIPTION

The following detailed description of example implementations refers to the accompanying drawings. The same reference numbers in different drawings may identify the same or similar elements.

Multiple virtual machines may be hosted by a cloud server. In this case, packets may be transmitted from a source virtual machine to a target virtual machine. Packet switching of the transmitted packets may be performed at a kernel level, or using hardware of the cloud server. In this case, however, poor network performance may result from packet bottlenecks and/or single points of failure.

To avoid such bottlenecks and/or failures, a shared memory based packet transfer technique may be used to permit the target virtual machine to obtain the packet from the source virtual machine using a pointer to a shared memory location. When such a shared memory based packet transfer technique is utilized, security policies may need to be applied to ensure data security for the cloud server.

Implementations described herein provide a cloud network that uses a distributed security switch to perform distributed switching and distributed security for shared memory based packet transfer. In this way, implementations described herein provide improved network security, reduced likelihood of failure, and improved network throughput relative to hardware-based packet transfer and/or shared memory techniques that do not utilize a distributed security switch to perform distributed switching and distributed security.

Figure 1A:
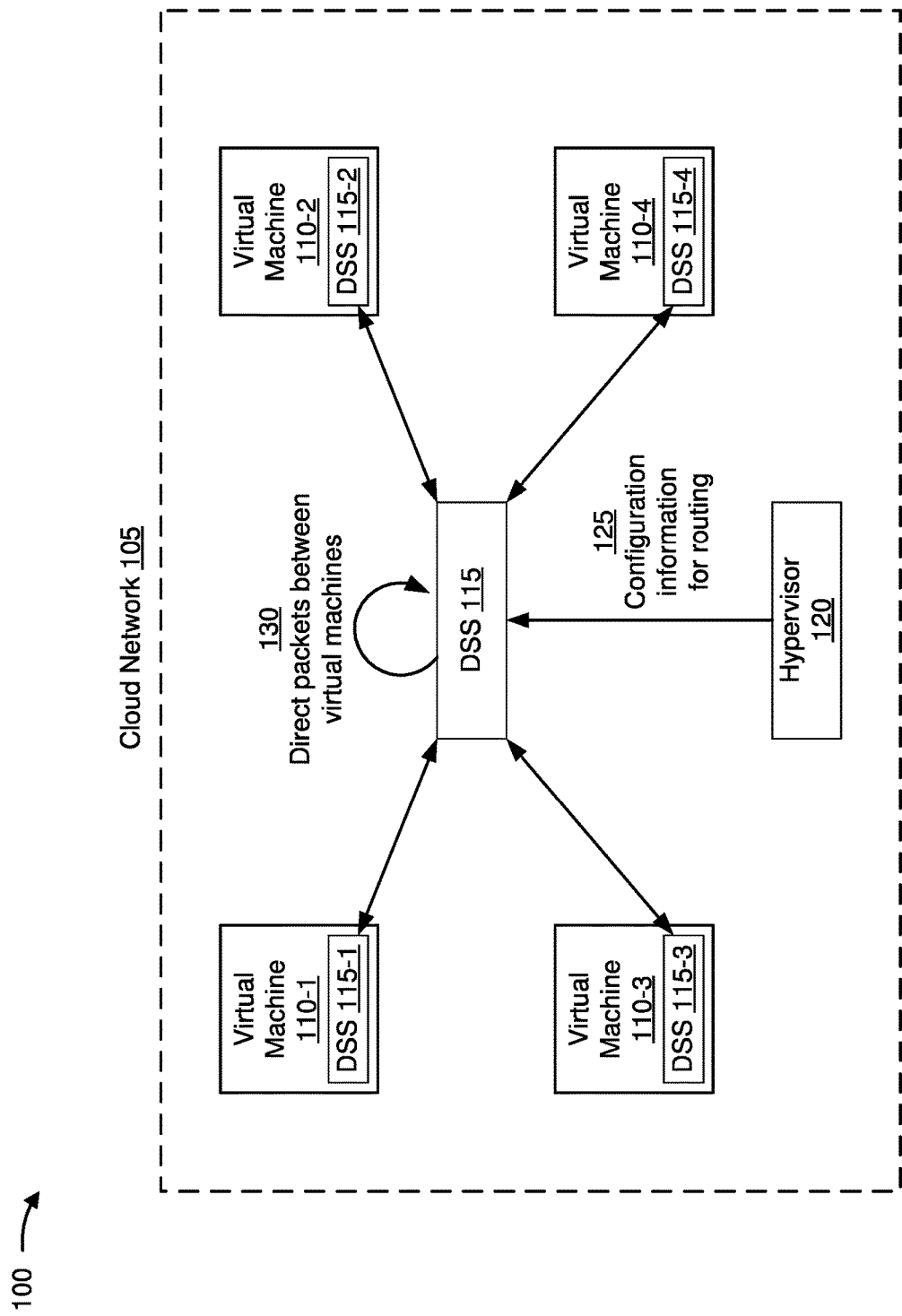
FIGS. 1A and 1B are diagrams of an overview of an example implementation described herein.
Figure 1B:
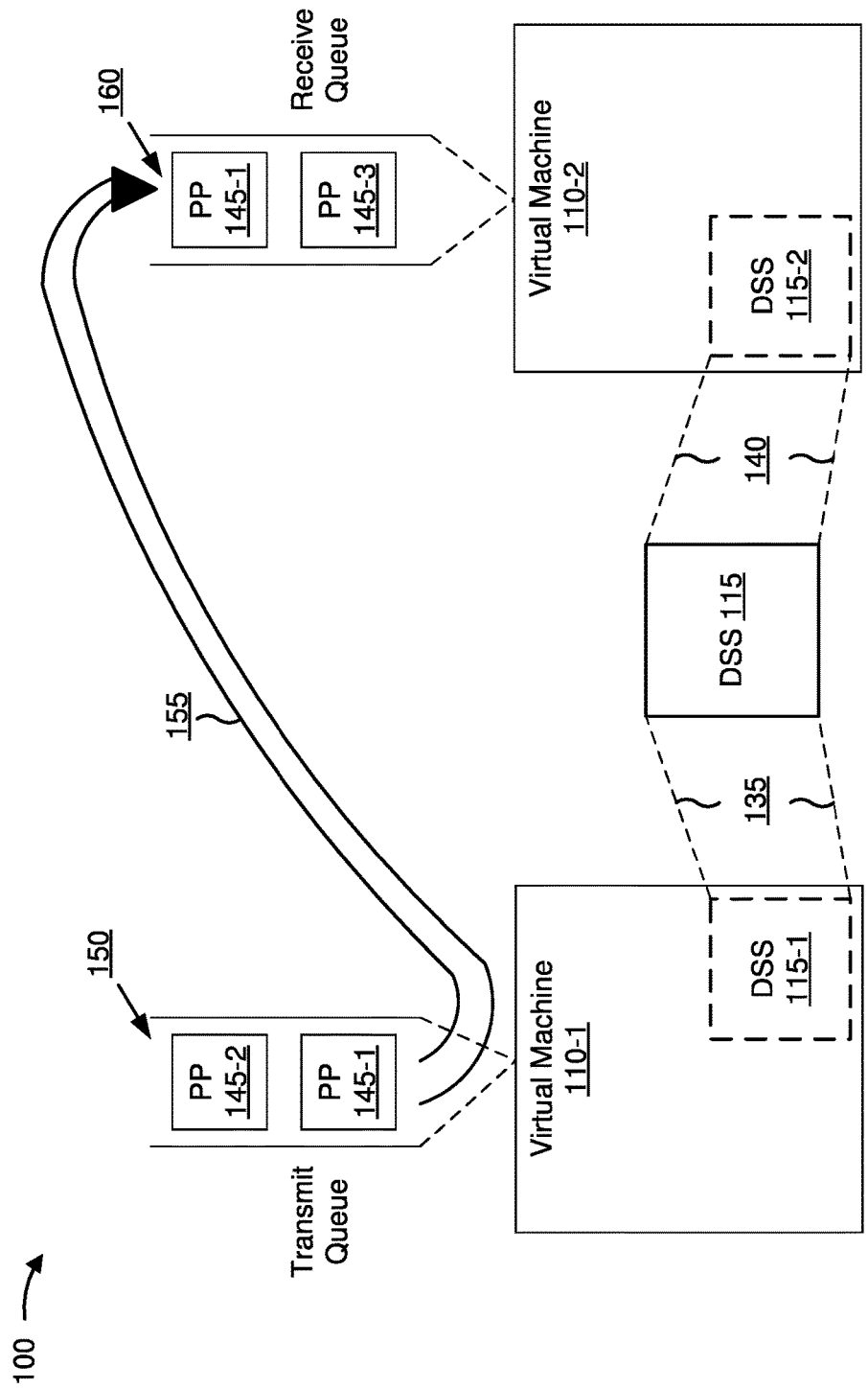

FIGS. 1A and 1B are diagrams of an overview of an example implementation 100 described herein. As shown in FIG. 1A, example implementation 100 may include cloud network 105. As further shown, cloud network 105 may include virtual machines 110 (shown as virtual machine 110-1 through virtual machine 110-4). As further shown, cloud network 105 may include distributed security switch 115. Distributed security switch 115 may provide a shared memory space among virtual machines 110. For example, virtual machine 110-1 may include distributed security switch 115-1, virtual machine 110-2 may include distributed security switch 115-2, virtual machine 110-3 may include distributed security switch 115-3, and virtual machine 110-4 may include distributed security switch 115-4.

As further shown in FIG. 1A, cloud network 105 may include hypervisor 120. As shown by reference number 125, hypervisor 120 may configure distributed security switch 115 to route network traffic among virtual machines 110, including providing configuration information for routing. As shown by reference number 130, distributed security switch 115 may direct packets among virtual machines 110 based on being configured by hypervisor 120. For example, as described herein with regard to FIG. 1B, distributed security switch 115 may direct packets between virtual machine 110-1 and virtual machine 110-2, and may enforce a security policy on packet transfers associated with transmission between virtual machine 110-1 and virtual machine 110-2.

As shown in FIG. 1B, virtual machine 110-1 and distributed security switch 115-1 may include an egress interface 135 from which packets are transferred, and virtual machine 110-2 and distributed security switch 115-2 may include an ingress interface 140 to which packets are transferred.

As further shown in FIG. 1B, a set of packet pointers 145 may be provided to a transmit queue 150 of distributed security switch 115-1 (e.g., of egress interface 135). In this case, packet pointers 145 are pointers to a set of packets stored in the shared memory provided by distributed security switch 115. As shown by reference number 155, cloud network 105 may route packet pointer 145-1 from egress interface 135 to a receive queue 160 of distributed security switch 115-2 (e.g., of ingress interface 140) to route a corresponding packet to virtual machine 110-2. In this case, distributed security switch 115 may route packet pointer 145-1 based on enforcing a security policy executed by virtual machine 110-1, as described in more detail herein with regard to FIG. 4.

In this way, cloud network 105 may provide improved network security, reduced likelihood of failure, and improved network throughput relative to hardware-based packet transfer and/or shared memory techniques that do not utilize a distributed security switch to perform distributed switching and distributed security.

As indicated above, FIGS. 1A and 1B are provided merely as an example. Other examples are possible and may differ from what was described with regard to FIGS. 1A and 1B.

Figure 2A:
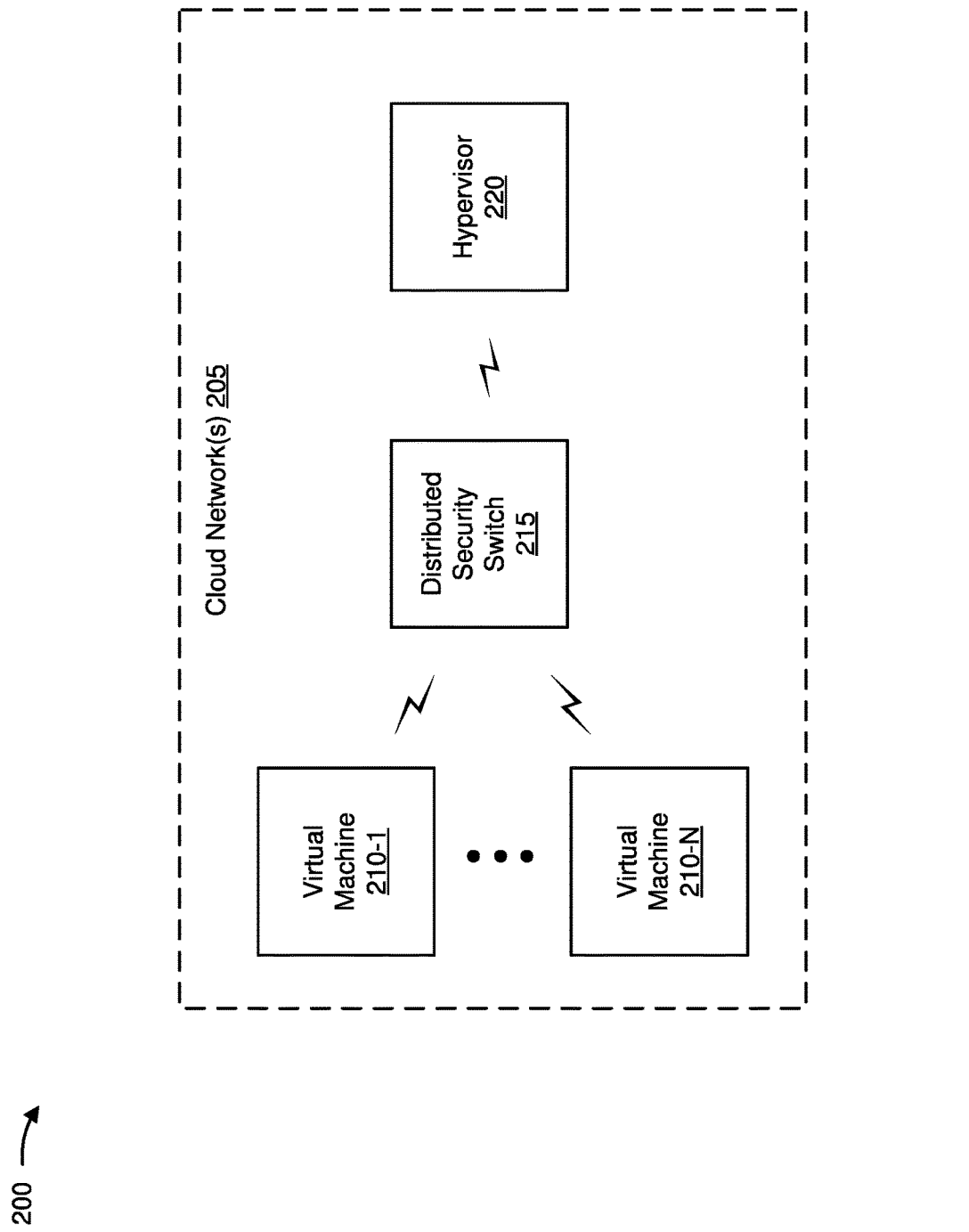
FIGS. 2A and 2B are diagrams of an example environment in which systems and/or methods, described herein, may be implemented.
Figure 2B:
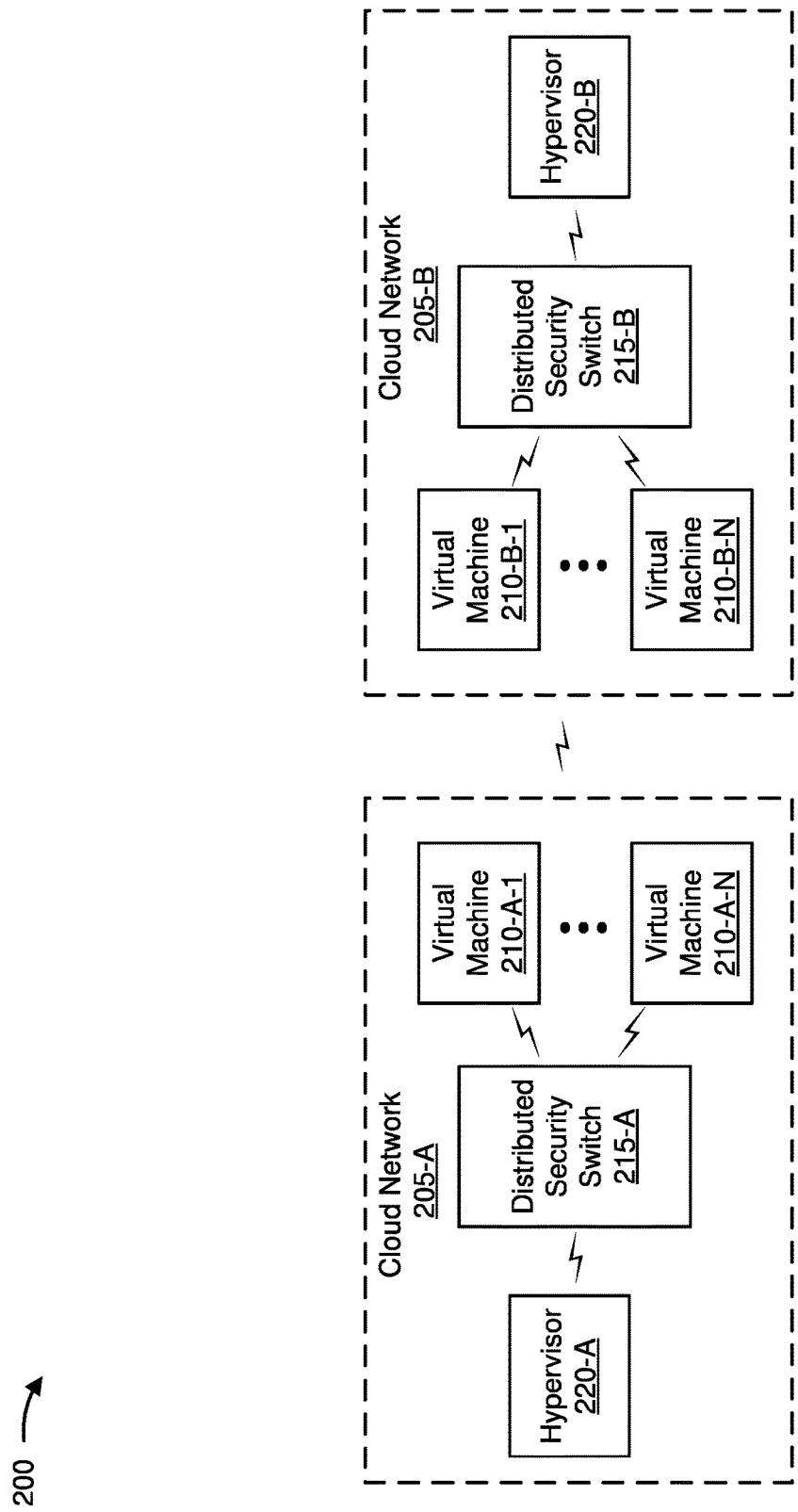

FIGS. 2A and 2B are diagrams of an example environment 200 in which systems and/or methods, described herein, may be implemented. As shown in FIG. 2A, environment 200 may include a cloud network 205, which includes one or more virtual machines 210-1 through 210-N(N≥1) (hereinafter referred to collectively as "virtual machines 210," and individually as "virtual machine 210"), a distributed security switch 215, and a routing engine 220. Devices of environment 200 may interconnect via wired connections, wireless connections, or a combination of wired and wireless connections.

Cloud network 205 includes an environment that hosts virtual machines 210, distributed security switch 215, routing engine 220, and/or the like. Cloud network 205 may provide computation, software, data access, storage, etc. services that do not require end-user knowledge of a physical location and configuration of system(s) and/or device(s) that host cloud network 205.

Cloud network 205 is hosted by hardware, such as one or more personal computers, workstation computers, server devices, switching devices, or other types of computation, communication, and/or routing devices. Cloud resources may include compute instances executed in hardware, storage devices provided in hardware, data transfer devices provided in hardware, etc. In some implementations, devices of cloud network 205 may communicate with other computing devices via wired connections, wireless connections, or a combination of wired and wireless connections.

Virtual machine 210 includes a software implementation of a machine (e.g., a computer) that executes programs like a physical machine. Virtual machine 210 may be either a system virtual machine or a process virtual machine, depending upon use and degree of correspondence to any real machine by virtual machine 210. A system virtual machine may provide a complete system platform that supports execution of a complete operating system ("OS"). A process virtual machine may execute a single program, and may support a single process. In some implementations, virtual machine 210 may execute on behalf of a user (e.g., a client device), and may manage infrastructure of cloud network 205, such as data management, synchronization, or long-duration data transfers.

In some implementations, virtual machine 210 may perform traffic transfer. For example, a source virtual machine 210 may store data in a shared memory space that may be accessed by a target virtual machine 210. In this case, based on the target virtual machine 210 accessing a packet pointer stored in the shared memory space, a packet corresponding to the packet pointer may be transferred from the source virtual machine 210 to the target virtual machine 210. In some implementations, virtual machine 210 may be a guest virtual machine of cloud network 205.

Distributed security switch 215 includes one or more control components of cloud network 205 to control traffic transfer and enforce a security policy for cloud network 205. Distributed security switch 215 may be implemented as a component of one or more virtual machines 210, a component independent of virtual machines 210, as both a component of one or more virtual machines 210 and a component independent of virtual machines 210, and/or the like. For example, distributed security switch 215 may be executed on a source virtual machine 210 to manage traffic transfer to a target virtual machine 210. Distributed security switch 215 may provide a switching fabric for data transfers between virtual machines 210. Additionally, or alternatively, distributed security switch 215 may perform packet analysis, application identification, intrusion detection and prevention, and/or the like.

In some implementations, distributed security switch 215 may perform security policy enforcement with respect to a packet transfer from a source virtual machine 210 to a target virtual machine 210. For example, distributed security switch 215 may store information identifying access modes associated with interfaces of virtual machines 210, and may determine policy actions for packet transfers based on the interfaces and/or access modes used for the packet transfers. In some implementations, distributed security switch 215 may be operated by a hypervisor of cloud network 205.

Routing engine 220 includes one or more control components of cloud network 205 to control operation of distributed security switch 215. For example, routing engine 220 may configure distributed security switch 215 to control network traffic transfer, as described herein. As another example, routing engine 220 may configure distributed security switch 215 to perform security policy enforcement with respect to network traffic transfer, as described herein.

Virtual machine 210, distributed security switch 215, and hypervisor 220 are implemented in hardware, firmware, or software executing on hardware.

As shown in FIG. 2B, example environment 200 may include a first cloud network 205-A connected to a second cloud network 205-B. Cloud networks 205-A and 205-B may correspond to cloud network 205 shown in FIG. 2A.

In some implementations, distributed security switches 215-A and/or 215-B of cloud network 205-A may enforce a security policy. For example, when a packet is being transferred between a virtual machine 210-A and a virtual machine 210-B, one or more of distributed security switches 215-A and/or 215-B may enforce a security policy based on an access mode attribute, as described in more detail herein.

The number and arrangement of devices, components, and/or networks shown in FIGS. 2A and 2B are provided as an example. In practice, there may be additional devices, components, and/or networks, fewer devices, components, and/or networks, different devices, components, and/or networks, or differently arranged devices, components, and/or networks than those shown in FIGS. 2A and 2B. Furthermore, two or more devices or components shown in FIGS. 2A and 2B may be implemented within a single device or component, or a single device or component shown in FIGS. 2A and 2B may be implemented as multiple, distributed devices or components. Additionally, or alternatively, a set of devices or components (e.g., one or more devices or components) of environment 200 may perform one or more functions described as being performed by another set of devices or components of environment 200.

Figure 3A:
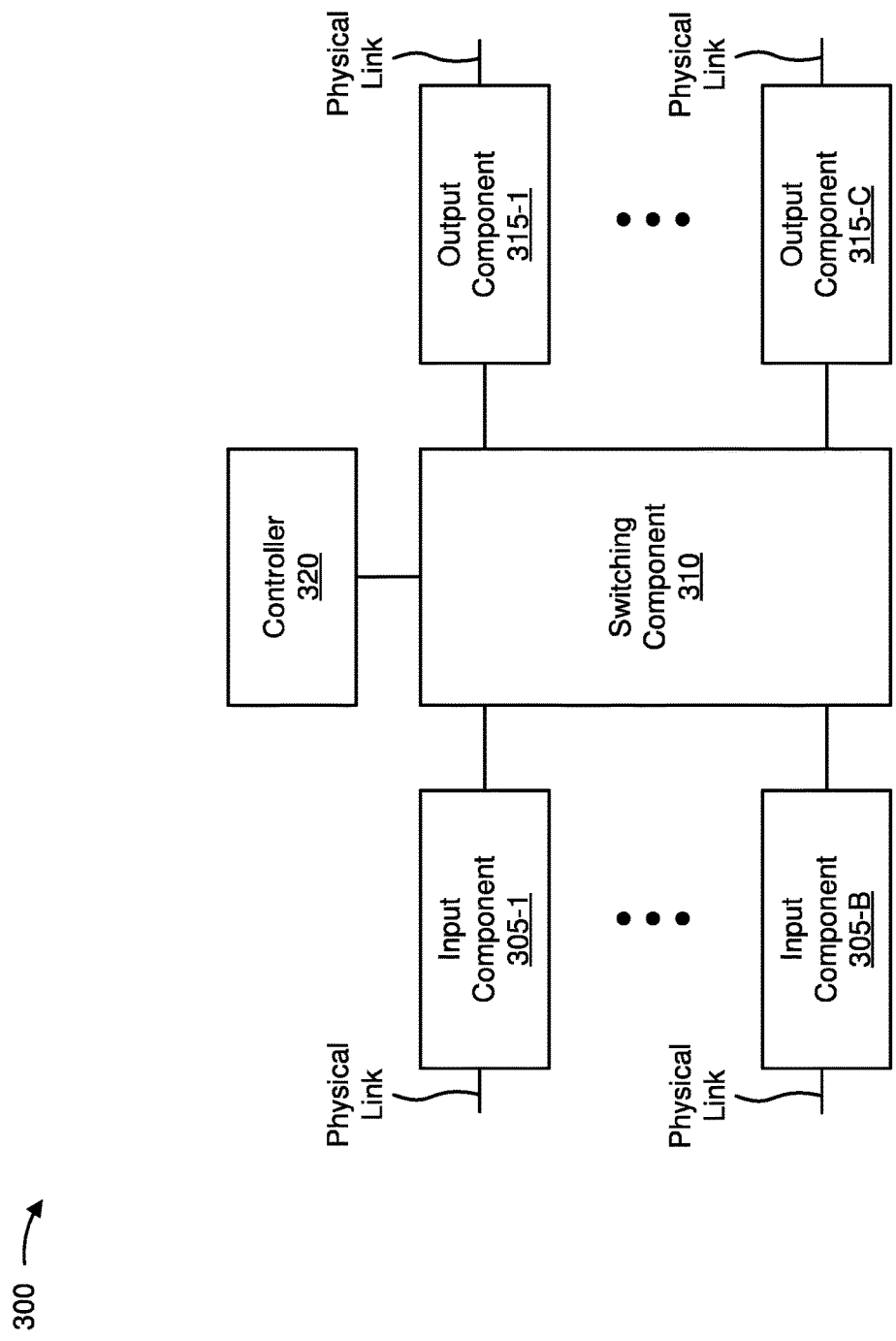
FIGS. 3A and 3B are diagrams of example components of one or more devices of FIG. 2.
Figure 3B:
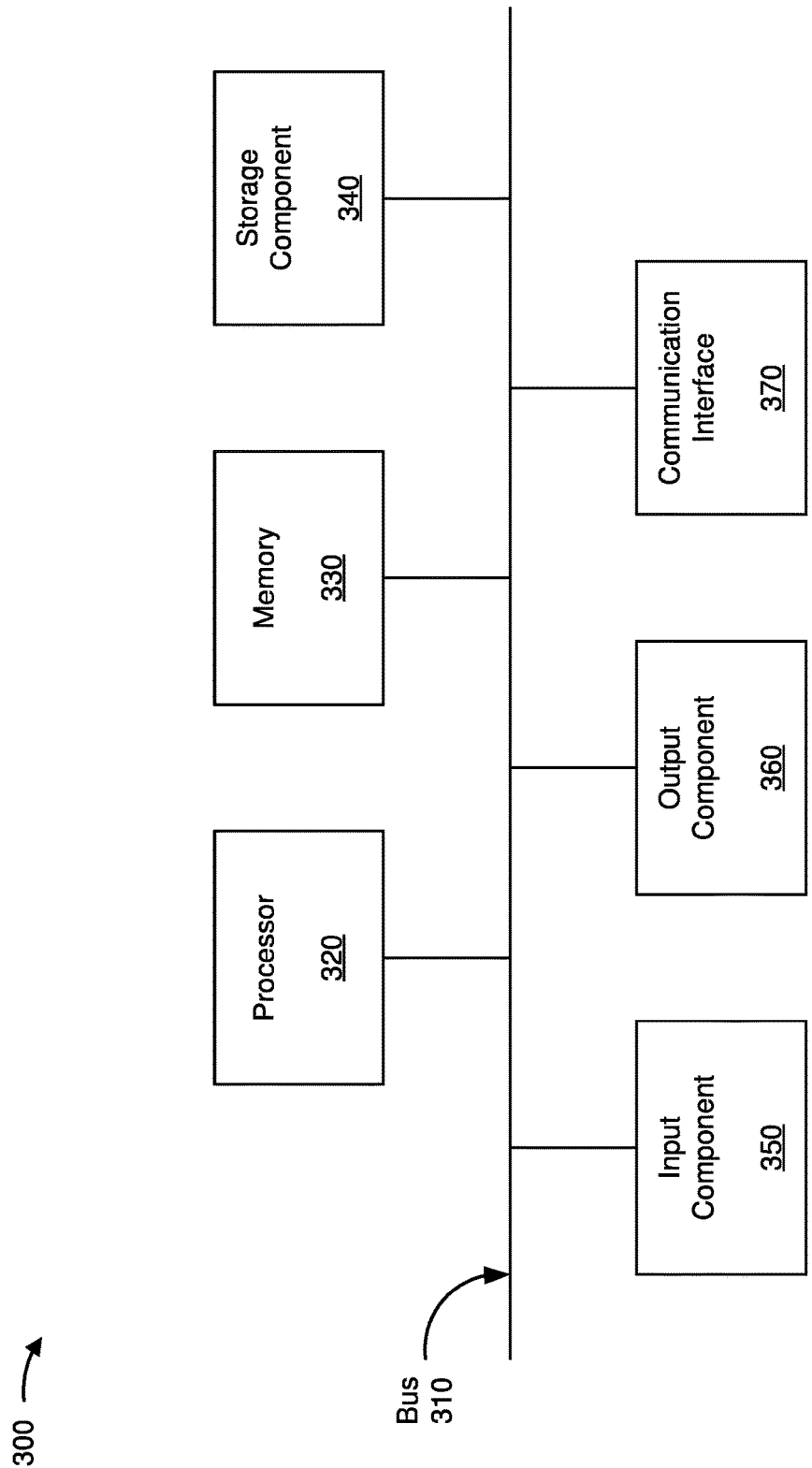

FIGS. 3A and 3B are diagrams of example components of a device 300. Device 300 may correspond to hardware executing to provide virtual machines 210, distributed security switch 215, and/or routing engine 220. In some implementations, the hardware executing to provide virtual machines 210, distributed security switch 215, and/or routing engine 220 may include one or more devices 300 and/or one or more components of device 300. As shown in FIG. 3A, device 300 may include one or more input components 305-1 through 305-B (B≥1) (hereinafter referred to collectively as input components 305, and individually as input component 305), a switching component 310, one or more output components 315-1 through 315-C(C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

As shown in FIG. 3B, device 300 may include a bus 325, a processor 330, a memory 335, a storage component 340, an input component 345, an output component 350, and a communication interface 355.

Bus 325 includes a component that permits communication among the components of device 300. Processor 330 is implemented in hardware, firmware, or a combination of hardware and software. Processor 330 is implemented in hardware, firmware, or a combination of hardware and software. Processor 330 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 330 includes one or more processors capable of being programmed to perform a function. Memory 335 includes a random access memory (RAM), a read only memory (ROM), and/or another type of dynamic or static storage device (e.g., a flash memory, a magnetic memory, and/or an optical memory) that stores information and/or instructions for use by processor 330.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 345 includes a component that permits device 300 to receive information, such as via user input (e.g., a touch screen display, a keyboard, a keypad, a mouse, a button, a switch, and/or a microphone). Additionally, or alternatively, input component 345 may include a sensor for sensing information (e.g., a global positioning system (GPS) component, an accelerometer, a gyroscope, and/or an actuator). Output component 350 includes a component that provides output information from device 300 (e.g., a display, a speaker, and/or one or more light-emitting diodes (LEDs)).

Communication interface 355 includes a transceiver-like component (e.g., a transceiver and/or a separate receiver and transmitter) that enables device 300 to communicate with other devices, such as via a wired connection, a wireless connection, or a combination of wired and wireless connections. Communication interface 355 may permit device 300 to receive information from another device and/or provide information to another device. For example, communication interface 355 may include an Ethernet interface, an optical interface, a coaxial interface, an infrared interface, a radio frequency (RF) interface, a universal serial bus (USB) interface, a Wi-Fi interface, a cellular network interface, and/or the like.

Software instructions may be read into memory 335 and/or storage component 340 from another computer-readable medium or from another device via communication interface 355. When executed, software instructions stored in memory 335 and/or storage component 340 may cause processor 330 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIGS. 3A and 3B are provided as an example. In practice, device 300 may include additional components, fewer components, different components, or differently arranged components than those shown in FIGS. 3A and 3B. Additionally, or alternatively, a set of components (e.g., one or more components) of device 300 may perform one or more functions described as being performed by another set of components of device 300.

FIG. 4 is a flow chart of an example process 400 for network traffic switching for virtual machines. In some implementations, one or more process blocks of FIG. 4 may be performed by distributed security switching component 215. In some implementations, one or more process blocks of FIG. 4 may be performed by another device or a group of devices separate from or including distributed security switching component 215, such as virtual machines 210 and routing engine 220.

As shown in FIG. 4, process 400 may include configuring routing of network traffic for virtual machines of a cloud network (block 410). For example, distributed security switch 215 may configure routing of network traffic for virtual machines 210 of cloud network 205. In some implementations, distributed security switch 215 may receive configuration information. For example, routing engine 220 may provide configuration information to configure distributed security switch 215. In some implementations, routing engine 220 may enable a transparent mode of distributed security switch 215. For example, routing engine 220 may configure distributed security switch 215 to include application layer (e.g., Open Systems Interconnection (OSI) layer 7) security features, such as application identification, intrusion detection and prevention, and/or the like.

In some implementations, routing engine 220 may configure distributed security switch 215 to include media access control (MAC) address learning. For example, routing engine 220 may provide a data-link layer (e.g., OSI layer 2) routing table for storage by distributed security switch 215. In this case, routing engine 220 may configure the routing table during routing (e.g., based on learning interfaces and/or MAC addresses during routing).

In some implementations, routing engine 220 may configure each interface of distributed security switch 215 independently based on the properties of the interface (e.g., based on whether the interface is an access interface or a trunk interface, based on a virtual local area network (VLAN)-identifier (ID), etc.).

In some implementations, routing engine 220 may assign, to each interface, an access mode attribute that relates to security. For example, the access mode attribute may indicate that an interface is a trusted interface or an untrusted interface. As a particular example, a first virtual machine 210 may have a first interface component VM1.IF1 that is untrusted and a second interface component VM1.IF2 that is trusted, and a second virtual machine 210 may have a first interface component VM2.IF1 that is trusted and a second interface component VM2.IF2 that is untrusted.

In some implementations, routing engine 220 may configure distributed security switch 215 to implement a security policy with regard to packets being transferred between virtual machines 210. For example, routing engine 220 may configure distributed security switch 215 to selectively permit packet routing based on a policy action. In this case, a policy action may include an allow action to pass a packet; a drop action to drop the packet and increment a counter (e.g., for utilization in performing analysis of logged packets, to track whether a threshold quantity of packets have been dropped, thereby triggering an analysis to determine whether a security threat is encountered, or the like); a log action to copy the packet for management viewing and/or analysis; an apply deep packet inspection action to inspect the packet for application identification, intrusion detection and prevention, etc.; and/or the like.

Although policy actions may be described, herein, in terms of a particular set of actions, distributed security switch 215 may utilize additional policy actions, fewer policy actions, a different set of policy actions, and/or the like. For example, another policy action may include an apply stateless screen checks action to perform a screen check with respect to the packet being transferred. A screen check may refer to a configurable security check to detect malicious traffic, such as a denial of service (DoS) attack. In this case, the apply stateless screen checks action may include a stateless firewall action performed at the switch level (e.g., to check whether the packet is a transmission control protocol (TCP) packet, check whether the packet is associated with a TCP SYN FLOOD type of distributed denial of service (DDoS) attack, etc.). Based on a result of a screen check, the screen check may be logged, another policy action may be applied to drop the packet, and/or the like. Additionally, or alternatively, in the case of a packet being transferred from a first virtual machine 210 of a first cloud network 205 to a second virtual machine 210 of a second cloud network 205 where the first cloud network 205 is a private cloud network and the second virtual machine 210 is determined to have a private Internet protocol (IP) address, a distributed security switch 215 of first or second cloud network 205 may enable a network address translation (NAT) filtering policy action. Additionally, or alternatively, a distributed security switch 215 (e.g., of the cloud network 205 to which the packet is being transferred) may enable an application-level gateway (ALG) as a policy action.

In some implementations, routing engine 220 may configure distributed security switch 215 to implement a security policy (e.g., determine a policy action) that determines routing of a packet based on an access mode attribute. For example, when a packet is to be transferred from an untrusted interface of a first virtual machine 210 (e.g., VM1.IF1) to a trusted interface of the first virtual machine 210 (e.g., VM1.IF2), distributed security switch 215 may apply an allow policy action, as described above.

As another example, when a packet is to be transferred from an untrusted interface of the first virtual machine 210 (e.g., VM1.IF.1) to a trusted interface of a second virtual machine 210 (e.g., VM2.IF1), distributed security switch 215 may apply allow (e.g., a packet passing action), perform deep packet inspection (e.g., a packet inspection action), and apply stateless screen checks (e.g., a packet screening action) policy actions.

As another example, when a packet is to be transferred from a trusted interface of the first virtual machine 210 (e.g., VM1.IF2) to a trusted interface of the second virtual machine 210 (e.g., VM2.IF1), distributed security switch 215 may apply an allow and log policy action (e.g., a combination of a packet passing action and a packet logging action).

As another example, when a packet is to be transferred from an untrusted interface of the second virtual machine 210 (e.g., VM2.IF2) to a trusted interface of the first virtual machine 210 (e.g., VM1.IF2), distributed security switch 215 may apply a drop policy action (e.g., a packet dropping action), as described above.

Additionally, or alternatively, routing engine 220 may configure distributed security switch 215 to apply other policy actions, or other combinations of policy actions, to combinations of source and target virtual machines 210 and/or interfaces thereof.

In some implementations, routing engine 220 may configure distributed security switch 215 to include an integrated routing and bridging (IRB) interface to permit routing engine 220 to perform packet analysis on host bound packets (e.g., packets being provided toward hypervisor 220).

As further shown in FIG. 4, process 400 may include determining that a packet is to be routed from a first virtual machine, of the virtual machines, to a second virtual machine of the virtual machines (block 420). For example, distributed security switch 215 may determine that a packet is to be routed from a first virtual machine 210 of cloud network 205 to a second virtual machine 210 of cloud network 205. In some implementations, distributed security switch 215 may be executed by computing resources of the first virtual machine (e.g., a source virtual machine). Additionally, or alternatively, distributed security switch 215 may be executed by computing resources of the second virtual machine (e.g., a target virtual machine), multiple virtual machines, and/or the like.

In some implementations, the source virtual machine 210 and the target virtual machine 210 may be included in the same cloud network 205. For example, distributed security switch 215 may determine that the packet is to be transferred using a shared memory queue of a common cloud network 205 from a first virtual machine 210 of cloud network 205 to a second virtual machine 210 of cloud network 205. In this case, distributed security switch 215 may determine to enforce a relatively non-computation-intensive security policy based on the packet remaining in a single cloud network 205. In this way, distributed security switch 215 maintains a relatively fast throughput for intra-cloud network packet transfers. In some implementations, the source virtual machine 210 (e.g., a first edge virtual machine) and the target virtual machine 210 (e.g., a second edge virtual machine) may be included in different virtual networks 205. In this case, distributed security switch 215 may determine to enforce a relatively computation-intensive security policy based on the packet being transferred from/to another cloud network 205. In this way, distributed security switch 215 maintains security for inter-cloud network packet transfers.

In some implementations, when a source virtual machine 210 makes a packet available to distributed security switch 215, distributed security switch 215 may analyze the packet and perform a data-link layer (e.g., OSI layer 2) routing table lookup (i.e., an L2 lookup in an L2 table based on an L2 parse). In this case, if a destination MAC address mapping is available (e.g., if the L2 table includes MAC address mapping to identify an ingress interface of a target virtual machine 210 based on address information of the packet), distributed security switch 215 may identify an egress interface of source virtual machine 210, may identify an ingress interface of target virtual machine 210, and may apply a security policy. For example, distributed security switch 215 may look up access modes of the egress interface and the ingress interface to determine how to process the packet (e.g., whether the packet is to be allowed or blocked). In this case, distributed security switch 215 may perform a security action based on looking up the source virtual machine 210, target virtual machine 210, access mode of the egress interface, and/or access mode of the ingress interface, in a policy table.

Additionally, or alternatively, if destination MAC address mapping is not available (e.g., such as when a packet is being directed to a new virtual machine 210 for which routing information has not been included in an L2 table), distributed security switch 215 may cause the packet to be broadcast to a set of available interfaces (other than the egress interface of virtual machine 210 from which the packet came), to attempt to direct the packet to the correct interface (e.g., in this case, incorrect interfaces of other virtual machines 210 may drop the packet and the correct interface of target virtual machine 210 may receive the packet). In some implementations, distributed security switch 215 may perform data-link layer (e.g., OSI layer 2) MAC address learning of a MAC address and egress interface of the source virtual machine 210, and may selectively broadcast to the interfaces based on a VLAN-ID.

As further shown in FIG. 4, process 400 may include selectively routing the packet based on the configuration information and a security policy and using shared memory of the cloud network (block 430). For example, distributed security switch 215 may selectively route the packet based on the configuration information and a security policy, and using shared memory of cloud network 205. In some implementations, distributed security switch 215 may route the packet by passing a packet pointer using the shared memory. For example, distributed security switch 215 may expose a packet pointer from a transmit queue of source virtual machine 210 identifying the packet stored in the shared memory to a receive queue of target virtual machine 210, thus causing the packet to be transferred from source virtual machine 210 to target virtual machine 210.

In some implementations, cloud network 205 (e.g., an edge virtual machine 210, distributed security switch 215, etc.) may perform an address translation when routing the packet. For example, when transferring a packet from a first cloud network 205 with an IP version 4 (V4) address scheme to a second cloud network 205 with an IP version 6 (V6) address scheme, an edge virtual machine 210 of the second cloud network 205 may perform an address translation from IPV4 to IPV6 to route the packet.

In some implementations, distributed security switch 215 may route the packet based on configuration of interfaces (e.g., access mode attribute, etc.) and security policy (e.g., drop, provide, log, screen, etc.). In some implementations, a logical processor of source virtual machine 210 may perform switching and apply the security policy by utilizing resources of cloud network 205 assigned to source virtual machine 210 to perform switching (e.g., to perform L2 table lookups, parses, etc.) and to apply the security policy (e.g., to identify a parameter relating to the egress interface and/or the ingress interface and determine whether to pass the packet based on the parameter relating to the egress interface and/or the ingress interface).

Based on using source virtual machine 210, switching and security are distributed across multiple virtual machines for packet transfers of multiple source virtual machines 210 of cloud network 205. In this way, distributed security switch 215 improves network performance, and reduces likelihood of failure relative to a single point of failure technique.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein provide a cloud network which uses a distributed security switch to perform distributed switching and distributed security for shared memory based packet transfer. In this way, implementations described herein provide improved network security, reduced likelihood of failure, and improved network throughput relative to hardware-based packet transfer and/or shared memory techniques that do not utilize a distributed security switch to perform distributed switching and distributed security for shared memory based packet transfer.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A cloud network that includes a plurality of virtual machines, a shared memory shared by the plurality of virtual machines, and a hypervisor, the cloud network comprising:
 a distributed security switch to:
  receive configuration information from the hypervisor,
   the configuration information including a set of access mode attributes for interfaces of the plurality of virtual machines and a security policy for the plurality of virtual machines;
  determine that a packet is to be directed from a source virtual machine, of the plurality of virtual machines, to a target virtual machine of the plurality of virtual machines;
  identify an egress interface of the source virtual machine and an ingress interface of the target virtual machine,
   the egress interface being associated with a first access mode attribute, of the set of access mode attributes, and the ingress interface being associated with a second access mode attribute of the set of access mode attributes; and selectively route the packet, using the shared memory, based on the first access mode attribute, the second access mode attribute, and the security policy,
wherein, when selectively routing the packet, the distributed security switch is to:
broadcast the packet to a set of interfaces of the plurality of virtual machines,
the set of interfaces including the ingress interface, and
the set of interfaces excluding the egress interface.

2. The cloud network of claim 1, where the distributed security switch is implemented by a particular virtual machine of the plurality of virtual machines.

3. The cloud network of claim 2, where the particular virtual machine is the source virtual machine.

4. The cloud network of claim 1, where the distributed security switch is further to:
obtain a set of security actions of the security policy; and
determine a particular security action, of the set of security actions, based on the first access mode attribute and the second access mode attribute; and
where the distributed security switch, when selectively routing the packet, is to:
selectively route the packet based on the first access mode attribute, the second access mode attribute, and the particular security action.

5. The cloud network of claim 4, where the particular security action includes at least one of:
a packet dropping action,
a packet passing action,
a packet logging action,
a packet screening action, or
a packet inspection action.

6. The cloud network of claim 1, where the set of access mode attributes includes at least one of:
an untrusted interface access mode attribute, or
a trusted interface access mode attribute.

7. The cloud network of claim 1, where the distributed security switch, when selectively routing the packet, is to:
make the packet available in the shared memory.

8. A method, comprising:
receiving, by a switch of a cloud network, configuration information,
the configuration information identifying a set of access mode attributes for interfaces of a plurality of virtual machines of the cloud network and a security policy for the plurality of virtual machines;
determining, by the switch of the cloud network, that a packet is to be directed from a source virtual machine, of the plurality of virtual machines, to a target virtual machine of the plurality of virtual machines;
identifying, by the switch of the cloud network, one or more access mode attributes, of the set of access mode attributes, relating to the source virtual machine or the target virtual machine; and
selectively routing, by the switch of the cloud network, the packet, using shared memory shared by the source virtual machine and the target virtual machine, based on the one or more access mode attributes and the security policy,
where selectively routing the packet comprises:
switching a packet pointer corresponding to the packet from a transmit queue of an egress interface of the source virtual machine to a receive queue of an ingress interface of the target virtual machine.

9. The method of claim 8, further comprising:
enforcing a policy action, of the security policy, on the packet; and
where selectively routing the packet comprises:
selectively routing the packet based on the policy action.

10. The method of claim 8, where the plurality of virtual machines are guest virtual machines.

11. The method of claim 10, where the switch of the cloud network is distributed across two or more virtual machines of the plurality of virtual machines.

12. The method of claim 8, further comprising:
determining that the packet is not to be blocked; and
wherein selectively routing the packet comprises:
routing the packet based on determining that the packet is not to be blocked.

13. The method of claim 8, wherein selectively routing the packet comprises:
selectively routing the packet using a hypervisor of a set of cloud networks.

* * * * *